Sept. 14, 1954 H. M. CARRIS 2,689,097
REEL
Filed June 26, 1951
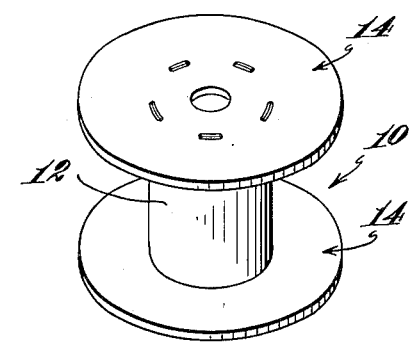
Fig. 1
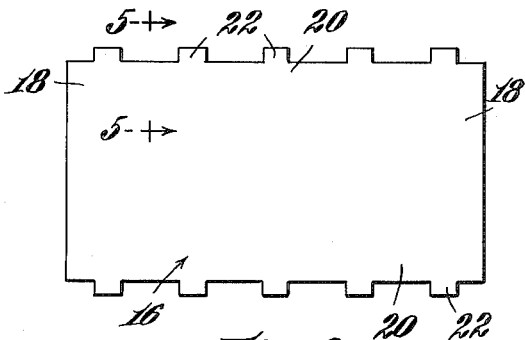
Fig. 2
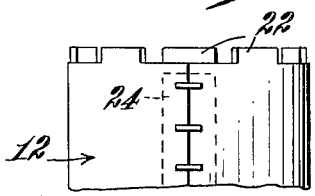
Fig. 3
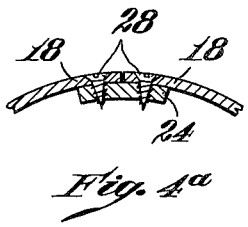
Fig. 4a
Fig. 4b
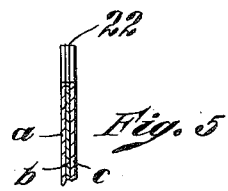
Fig. 5
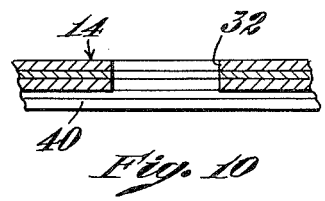
Fig. 10
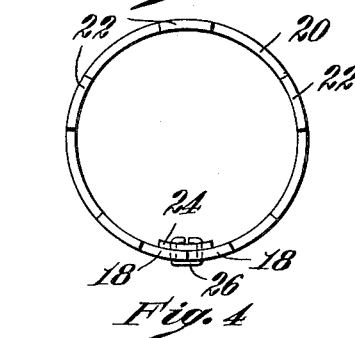
Fig. 4
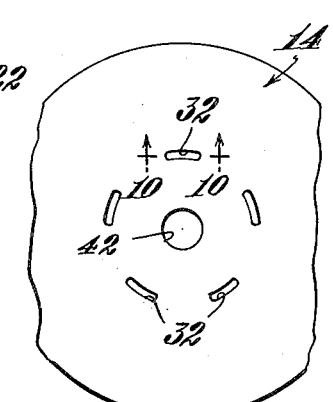
Fig. 6
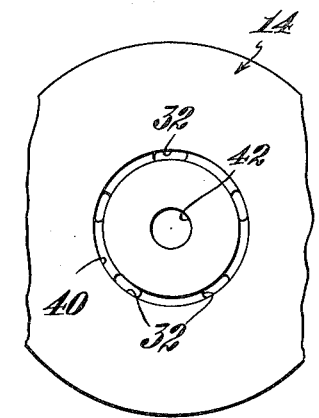
Fig. 7
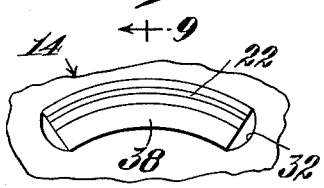
Fig. 8
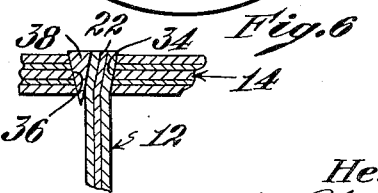
Fig. 9
Inventor
Henry M. Carris
by Roberts, Cushman & Grover
Attys Patented Sept. 14, 1954

2,689,097

UNITED STATES PATENT OFFICE 2,689,097

REEL

Henry M. Carris, Ludlow, Vt.

Application June 26, 1951, Serial No. 233,623

2 Claims. (Cl. 242—118)

This invention relates to reels or spools such as are employed to store and/or ship wire, chain, cable, belting and the like and more especially to overall improvements in the construction of such spools. The principal object of the invention is to provide a spool which will be highly resistant to endwise bursting, that is separation of the heads from the barrel when the loaded spool is carelessly handled and/or accidentally dropped. Another object is to provide a spool barrel of especially rigid construction to which the heads may be attached without weakening the central portions of the heads for reception of the ends of the barrel and hence without sacrificing the resistance of the heads to diametrical cracking. A further object is to attach the heads to the ends of the barrel with attaching means located as far from the axis of the barrel as possible thereby to minimize the bending moment produced by force applied to the rim of the head and hence to reduce the breaking stress imparted to both the head and the fastening means. Still other objects are to provide a spool which may be made of sheet material of various kinds and may be easily and economically manufactured.

As herein illustrated, the reel hereinafter referred to as a spool has a barrel and flanges or heads attached thereto. The barrel is made of a single piece of substantially rectangular sheet material, bent to bring its opposite ends together to provide an open ended cylinder, and has at its opposite ends spaced tenons formed integral therewith. The heads are circular and have a plurality of spaced mortises corresponding in number to the tenons into which the tenons extend and are made fast by wedges driven into the mortises against the tenons in such fashion as to bend the tenons out of alignment with the axis of the barrel. The mortises have inclined walls diverging outwardly, that is from the inner sides of the heads to the outer sides, and the wedges are driven into the mortises from the outside so as to bend the tenons outwardly against the outwardly inclined walls of the mortises. The heads may also have in their inner sides circular grooves corresponding in diameter to the barrel ends into which the end portions of the barrel fit. When thus constructed the mortises are formed in the bottoms of the grooves and extend through to the outer sides of the heads. The abutting ends of the barrel may be attached or unattached and if attached fastening means in the form of staples and/or screws may be employed together with an inner reinforcing strip. The barrel is made of wood, for example veneer, bent parallel to its grain, or of plywood. The heads are also made of plywood. If desired the barrel may be made of other materials, such as sheet metal, paper board, sheet plastic and so forth. The material used for making the heads, however, is preferably limited to plywood since it affords a light weight rigid construction having suitable thickness for receiving the grooves and mortises.

The invention will now be described in greater detail with reference to the accompanying drawings wherein:

Fig. 1 is a perspective view of the completed spool;

Fig. 2 is a plan view of a blank from which the barrel of the spool is constructed;

Fig. 3 is an elevation of the completed barrel made from the blank shown in Fig. 2;

Fig. 4 is a top view of the barrel shown in Fig. 3 illustrating one method of joining the abutting ends of the blank forming the cylinder;

Fig. 4a is a fragmentary section diametrically of the barrel showing another method for joining the abutting ends of the blank to make the barrel;

Fig. 4b is a corresponding section showing still another way of joining the abutting ends of the blank to make the barrel;

Fig. 5 is a fragmentary section taken on the line 5—5 of Fig. 2;

Fig. 6 is a plan view of the outer side of a head;

Fig. 7 is a plan view of the inner side of a head;

Fig. 8 is an enlarged fragmentary view of the head of the spool showing a mortise with the tenon of the barrel anchored therein by a wedge;

Fig. 9 is a fragmentary section taken on the line 9—9 of Fig. 8; and

Fig. 10 is an enlarged fragmentary section taken on the line 10—10 of Fig. 6.

Referring to the drawings (Fig. 1), the spool consists of a barrel 12 and heads 14 attached to its opposite ends. The barrel which is cylindrical in form is made of sheet material, a blank 16 for making the same being shown in Fig. 2 as being of substantially rectangular shape having ends 18—18 and sides 20—20. Along the opposite sides 20—20 are formed integral with the blank a plurality of spaced tenons 22, the number and spacing of which will depend upon the size of the spool, the material used and the strength required. The blank as shown in Fig. 5 is made of plywood having two or more plys a, b and c. However, it is to be understood that other rigid, light and durable sheet material may be employed, for example veneer, sheet metal, heavy paper board, Durone, Masonite, chip board and many of the sheet plastics.

The blank when made of plywood or veneer is heated and then bent about an arbor to bring its opposite ends 18—18 into abutting relation thereby to form an open ended cylinder as shown in Fig. 3, the sides 20—20 of the blank now constituting the ends of the cylinder. As illustrated in Figs. 3 and 4 the abutting ends of the blank may be fastened by placing a reinforcing strip 24 inside of the cylinder over the abutting ends and then inserting a number of staples 26 through the ends of the blank and reinforcing strip. Alternatively, (Fig. 4a) the abutting ends of the blank may be fastened to a reinforcing strip 24 by means of screws 28. In some instances, the reinforcing strip may be omitted and the abutting ends may be fastened simply by the use of staples 30 as illustrated in Fig. 4b. As will be pointed out hereinafter, in at least one mode of construction the fastening means may be omitted entirely.

The spool ends or heads 14 (Fig. 6) are provided with a plurality of mortises 32 arranged circularly about the center of the head and are radially positioned from the center of the head at distances corresponding to the radial distance of the tenons from the axis of the barrel to receive the tenons 22. As illustrated in Figs. 8 and 9 the mortises are arc-shaped, the radius of the arc corresponding to the radius of the barrel and have sloping walls 34 and 36 diverging from the insides of the heads toward the outsides. The heads are applied to the ends of the cylinder by forcing the tenons into and through the mortises as shown in Fig. 9 whereupon wedges 38 are driven into the mortises at the inner sides of the tenons so as to bend the latter outwardly into engagement with the outer inclined walls 34. Driving the wedges 38 into the position shown in Fig. 9 is generally sufficient to anchor the heads to the barrel. However, it may also be desirable to apply an adhesive or cement to the wedges before they are driven into place to give additional strength or to apply cement to the walls of the mortises. The wedges may be made of wood or metal and if plastics are employed in the construction of the spool the wedges may be made of plastic.

While as just described the insides of the heads are flush with the ends 20—20 of the barrel between the tenons 22, added strength may be imparted by forming in the inside of each head a continuous circular groove 40, such as shown in Fig. 7, into which the end portions of the cylinder may be thrust. The mortises 32 in this case are formed in the bottoms of the grooves and extend from the bottoms through to the outer sides of the heads. In applying the heads to the ends of the barrel, cement may be applied to the inner walls of the grooves as well as to the tenons and wedges. When using the grooves 40 on the inside surfaces of the heads, it is not necessary to employ fastening means for securing the abutting ends of the blank 16 of the cylinder since the grooves hold the blank of the barrel in cylindrical shape. The heads have small openings 42 at their centers so that the spool may be mounted in a spindle for winding.

As heretofore pointed out, the blank for making the barrel and the heads are preferably made of plywood of multi-ply construction which provides a very rigid, durable and light weight spool. In place of plywood, veneer may be used bent parallel to its grain. While it is known that spool barrels have heretofore been made of sheet metal, have been made of staves or slats and have been made of solid wood, it is believed to be novel as illustrated and described herein, to make a spool barrel of a single piece of sheet plywood or veneer with integral tenons which afford great strength when they are bent into engagement with the mortises in the heads. It is to be observed that the tenons are especially resistant to breaking in the veneer since the grain is parallel to the tenons.

Various combinations of barrel and heads may be employed, for example, a veneer barrel and plywood heads, a metal barrel and plywood heads and a plastic barrel and plywood heads. Plastic may also be employed for the heads. However, it is to be observed that metal heads are not very satisfactory since the thickness of the heads would make them very heavy.

In most spools heretofore made, the heads have had large circular holes made at their centers and the ends of the barrel were driven into these holes. This removed a considerable portion of the heads at their centers, greatly weakening them at the very point where maximum strength is desired to resist diametrical cracking. Maximum strength is preserved in the construction employed herein by piercing the heads only at the point where the tenons extend through them so that the entire central portions of the heads remain intact. The small openings 42 at the centers of the heads for the purpose of mounting them on spindles for the winding operation do not substantially weaken them.

Another important feature of applicant's construction resides in the fact that the ends of the barrel are anchored to the heads as far from the axis of the barrel as possible thereby reducing the length of the moment arm of any force applied to the rim of the head which has a tendency to break the head away from the barrel.

When the spool is made of wood a filler or finish coat of preservative material may be applied to the surface. It is to be understood, however, that the spool may be left uncoated.

It should be understood that the present disclosure is for the purpose of illustration only and that this invention includes all modifications and equivalents which fall within the scope of the appended claims.

I claim:

1. A spool comprising a barrel and heads at its opposite ends, said barrel having tenons at its ends and said heads having mortises into which the tenons extend, said mortises having walls spaced radially with respect to the axis of the barrel, one of which is inclined to the axis of the barrel so that the walls diverge from the inside of the head toward the outside thereof, said tenons being bent at an angle to the axis of the barrel into engagement with the inclined walls of the mortises and wedges set into the mortises against the bent tenons and the other walls of the mortises.

2. A spool according to claim 1 wherein both walls of the mortises are inclined to the axis of the barrel.

References Cited in the file of this patent

UNITED STATES PATENTS

| Number | Name | Date |
|---|---|---|
| 237,874 | Jennings | Feb. 15, 1881 |
| 501,897 | Pendleton | July 18, 1893 |
| 866,236 | Stout | Sept. 17, 1907 |
| 983,973 | Briggs | Feb. 14, 1911 |
| 1,336,011 | Wood | Apr. 6, 1920 |
| 2,406,636 | Rasor | Aug. 27, 1946 |
| 2,567,857 | Proctor | Sept. 11, 1951 |

FOREIGN PATENTS

| Number | Country | Date |
|---|---|---|
| 339,416 | Great Britain | Dec. 11, 1930 |